United States Patent
Roy

(10) Patent No.: US 12,519,727 B2
(45) Date of Patent: Jan. 6, 2026

(54) SYSTEMS AND METHODS FOR INROUTE THROTTLING IN SATELLITE NETWORKS

(71) Applicant: Hughes Network Systems, LLC, Germantown, MD (US)

(72) Inventor: Satyajit Roy, Gaithersburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 99 days.

(21) Appl. No.: 18/345,914

(22) Filed: Jun. 30, 2023

(65) Prior Publication Data

US 2025/0007840 A1 Jan. 2, 2025

(51) Int. Cl.
*H04L 47/12* (2022.01)
*H04J 3/22* (2006.01)
*H04L 47/2408* (2022.01)

(52) U.S. Cl.
CPC .............. *H04L 47/12* (2013.01); *H04J 3/22* (2013.01); *H04L 47/2408* (2013.01)

(58) Field of Classification Search
CPC .......................... H04L 47/12; H04L 47/2408
See application file for complete search history.

(56) References Cited

U.S. PATENT DOCUMENTS

| | | | | |
|---|---|---|---|---|
| 9,699,088 | B2 * | 7/2017 | Roy | H04W 8/04 |
| 10,367,578 | B2 * | 7/2019 | Xu | H04W 28/0284 |
| 11,044,208 | B2 * | 6/2021 | Xu | H04L 43/0876 |
| 2005/0163048 | A1 * | 7/2005 | Arora | H04L 47/20 |
| | | | | 370/230 |

FOREIGN PATENT DOCUMENTS

CN    105611537 A  *  5/2016  ............ H04W 16/10

OTHER PUBLICATIONS

European Patent Office, "International Search Report and Written Opinion for PCT Application No. PCT/US2024/030829", mailed Oct. 4, 2024, 11 pages.

* cited by examiner

Primary Examiner — Emmanuel L Moise
Assistant Examiner — Mariegeorges A Henry
(74) Attorney, Agent, or Firm — Mannava & Kang, P.C.

(57) ABSTRACT

A system for inroute throttling in a satellite network is disclosed. The system includes an IP Gateway (IPGW) that may compute a volume usage count of inroute traffic associated with a terminal, compare the computed volume usage count of inroute traffic with a first threshold, and transmit, based on the comparison, a Fair Access Policy (FAP) state to the terminal. The FAP state corresponds to one of a throttled and an unthrottled. The system further includes an Inroute Group Manager (IGM) that may receive, from the terminal, the FAP state and apply a FAP, on the inroute traffic from the terminal, corresponding to the received FAP state.

19 Claims, 6 Drawing Sheets

SYSTEMS AND METHODS FOR INROUTE THROTTLING IN SATELLITE NETWORKS

BACKGROUND

In a shared access network, for example, a broadband satellite network, users may connect to the Internet via a shared wireless channel and a network gateway. The shared wireless channel may provide physical access to the network for a certain number of very small aperture terminals (VSATs), but may have limited capacity, for example, for certain spectrum, some types of modulation and coding schemes. The network gateway may perform tasks, such as, for example, setting up a connection, traffic management and quality of service (QOS) provisioning. In addition, the network gateway may perform other tasks like implementing service plan configurations on the forward direction (outroute) in the satellite network.

Typically, in the return direction (inroute) on the satellite network, VSATs may share an inroute channel with a certain bandwidth when transmitting data. In addition, due to limited bandwidth, an inroute to the network gateway (of the satellite network) may be congested for certain periods of time, for instance. In certain other scenarios, without appropriate inroute traffic regulation, low priority user may block high priority traffic, causing unsatisfied QoS.

Several factors may be considered by the network gateway when allocating bandwidth to the inroute traffic. For instance, the bandwidth may be allocated based on the actual demand for the purposes of efficient spectrum utilization. A VSAT may report its backlog to obtain bandwidth on a return channel for transmitting data. Some traffic classes, for example, interactive traffic, may need to have higher priority than other traffic, such as streaming and bulk traffic, when granting bandwidth, but should not be able to completely block lower priority traffic. When the network is congested, a VSAT may experience degraded QoS, e.g., reduced service rate or longer latency. Fairness criteria or policy (e.g., Fair Access Policy) may require that the reduced service rate be proportional to the VSAT's service plan. In another scenario, a VSAT may be allowed to occupy the whole channel at a scheduled time in order to transmit large sized bursts as per the service plan configuration.

In general, Fair Access Policy (FAP) and traffic throttling are known concepts in communication and networking. For instance, the cellular terrestrial network may support FAP both in the uplink (inroute or return) and the downlink (outroute or forward) directions. Because of the availability of more spectrums and with the advent of 4G and 5G technologies, most of the service providers may provide an unlimited volume usage service to customers. In typical scenarios, most customers may subscribe to unlimited service plans by paying a little extra.

However, such unlimited service plans may not be available in a satellite communication network. There still exists the use case of downlink FAP based on volume usage among consumer services because satellite resources are not available at a large scale and reduced cost, unlike the terrestrial counterpart. Further, given the asymmetric link budget between return and forward channels (e.g., the return channel capacity is typically $1/3^{rd}$ to $1/4^{th}$ of the forward channel capacity), the channel capacity of inroute is significantly lower. Also, the latest trend among users may include more inroute-intensive applications such as, for example, uploading large-size content, streaming uplink video sessions, and other such applications. Existing technologies may not provide efficient inroute FAP and traffic throttling mechanism for satellite communication networks. Therefore, it may be desirable to provide reliable inroute traffic throttling mechanisms in satellite communication networks.

Figure 1:
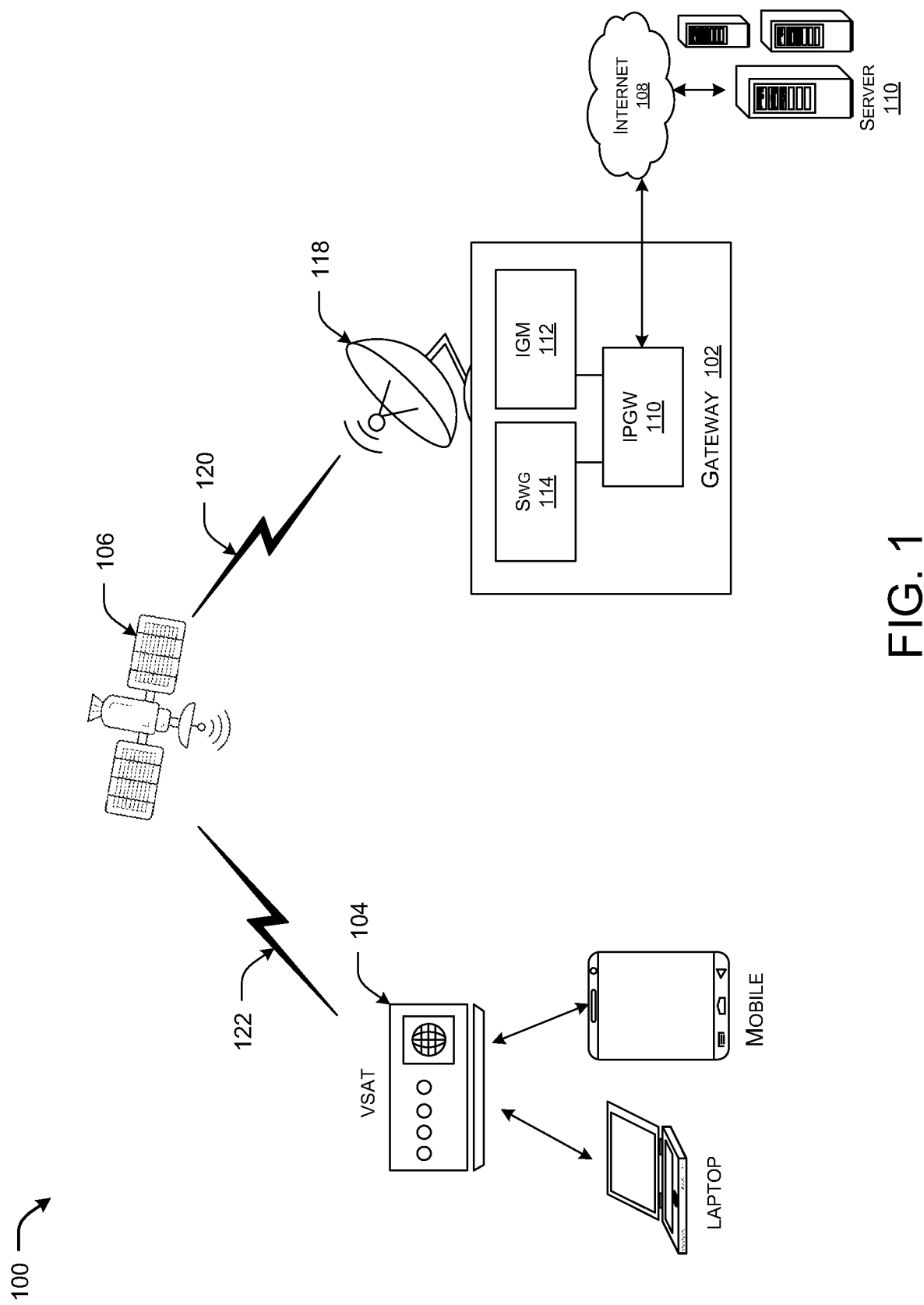
FIG. 1 illustrates an operating environment or a network architecture for implementing a system for inroute throttling in a satellite network.

The foregoing shall be more apparent from the following more detailed description of the disclosure.

DETAILED DESCRIPTION

In the following description, for the purposes of explanation, various specific details are set forth in order to provide a thorough understanding of examples of the present disclosure. It will be apparent, however, that examples of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the scope of the present disclosure as set forth.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, and other such artifacts. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

Reference throughout this specification to "one example" or "an example" or "an instance" or "one instance" means that a particular feature, structure, or characteristic described in connection with the example is included in at least one example of the present disclosure. Thus, the appearances of the phrases "in one example" or "in an example" in various places throughout this specification are not necessarily all referring to the same example. Furthermore, the particular features, structures, or characteristics may be combined in any suitable manner in one or more examples.

The terminology used herein is for the purpose of describing particular examples only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Existing technologies support Fair Access Policy (FAP) by throttling only downlink traffic, but uplink traffic flows with the same speed/rate as prior to the execution of the FAP. Further, the recent traffic trend shows the usage of inroute channel resources heavily since the inroute return channel is not just limited to communication of small acknowledgements (ACKs), Voice over Internet Protocol (VOIP) packets, and other small messages. Return channel or inroute resources are usually scarce compared to the forward channel or outroute resources. Therefore, it is desirable to throttle inroute traffic when a terminal is in FAP.

To this end, the proposed examples provide an end-to-end system design for automated inroute throttling in a satellite network. In an example, a volume-usage based inroute traffic throttling may be achieved by determining the volume of both inroute and outroute traffic of a terminal and by configuring one volume usage threshold. In another example, the volume-usage based inroute traffic throttling may be achieved by counting only the volume of inroute traffic of a terminal and comparing it with an inroute specific FAP threshold independent of the outroute specific FAP threshold. The proposed examples also provide for a centralized decision making process and a distributed action process for inroute traffic throttling. In an example, the disclosed system provides fraudulent protection on messaging that may be exchanged over the air between a terminal and the gateway. Fair Access Policy (FAP) may include the application of data usage thresholds and traffic management to ensure acceptable and fair use of the network resources (e.g., bandwidth). FAP may also include policies that restrict and limit the usage of bandwidth based on some preconfigured thresholds or service plan configurations.

The disclosed examples also provide for a service plan-based volume usage threshold configuration with an option of unlimited service for users who pay a premium. In an example, the proposed system provides the throttling of inroute traffic based on different policing intervals that may be configurable by an admin user at a network management system (NMS). For example, the policing intervals may be set to hourly, daily, weekly, and monthly. In an example, the disclosed system supports peak and off-peak differentiation in terms of volume determination and throttled traffic speed. In an example, the disclosed system supports traffic speed throttling for guaranteed Quality of Service (QOS) terminals at different levels of predefined subscriptions. For instance, the predefined subscriptions may include peak, maximum guaranteed, minimum guaranteed, etc. In an example, the disclosed system implements a multi-stage FAP for inroute traffic throttling.

The various examples of the systems and methods will be explained in more detail with reference to FIGS. 1-3.

FIG. 1 illustrates an example satellite communication system 100 for inroute throttling in a satellite network. The satellite communication system 100 may include a satellite ground station 102 (also referred to as "gateway" hereinafter), a Very Small Aperture Terminal (VSAT) 104 (also referred to as "terminal" hereinafter), a satellite 106, and the Internet 108. The gateway 102 may include IP gateways (IPGW) 110, an Inroute Group Manager (IGM) 112, and a Satellite Gateway (SGW) 114. The satellite communication system 100 may be a shared access network and may connect end user devices (e.g., mobile, laptops) to application servers 116.

The gateway 102 may correspond to high capacity, large antenna earth stations with connectivity to ground telecommunications infrastructure. The gateway 102 may be connected to the VSAT 104 population through an RF Terminal (RFT) 118 and the satellite 106. The RFT 118 may include an antenna, electronics, and connectivity to allow for communication access to the satellite 106. The RFT 118 may be the physical equipment responsible for the sending and receiving of signals to and from the satellite 106, and may provide an air interface for the gateway 102.

In an example, the gateway 102 may include the IGM 112. The IGM 112 may be a bandwidth controller or throttler executing one or more bandwidth throttling algorithms. The IGM 112 may assign bandwidth to a plurality of VSATs (e.g., 104) in the form of inroute groups, based at least on one or more parameters. In an example, the one or more parameters may include, but not be limited to, determined volume of traffic to and from the VSAT 104, requests for bandwidth from the VSAT 104, a service plan that is applicable to the VSAT 104 or end user device connected to the VSAT 104, one or more policing intervals, peak or off-peak times, and different levels of subscriptions.

Referring to FIG. 1, feeder links 120 may carry data between the gateway 102 and the satellite 106, and may include a forward uplink for transmitting data from the gateway 102 to the satellite 106, and a return downlink for transmitting data from the satellite 106 to the gateway 102. User links 122 may carry data between the satellite 106 and the VSAT 104, and may include a return uplink for transmitting data from the VSAT 104 to the satellite 106, and a forward downlink for transmitting data from the satellite 106 to the VSAT 104. The forward uplink and the forward downlink may form an "outroute," and the return uplink and the return downlink may form an "inroute." In an example, an "inroute" may refer to a carrier at a specified frequency divided into multiple slots on which the IGM 112 may assign one, for Time Division Multiplexing, or multiple, for Spread Code Division Multiplexing, VSATs 104 to utilize bandwidth in a non-contentious manner. In an example, an inroute group may be a set of inroutes or similar physical layer characteristics on which the IGM 112 may balance the assignment of VSATs 104 with bandwidth requests.

The satellite communication system 100 may include a VSAT population that may include a plurality of VSATs or Mobile Satellite Terminals, which may be used by end users to access the satellite communication system 100. A VSAT 104 may include a remote satellite dish for receiving RF signals from and transmitting RF signals to the satellite 106, a satellite modem and other equipment for managing the sending and receiving of data, and one or more remote hosts, which may be computer systems or other electronic devices capable of network communications at a site remote from the gateway 102. For example, a VSAT 104 may be used at a residence or place of business to provide access to the Internet 108.

The satellite 106 may be any suitable communications satellite for connecting the gateway or hub 102 to the VSAT population. For example, the satellite 106 may correspond to a simple bent-pipe design geostationary satellite, which may accommodate innovations and variations in transmission parameters, operating in the Ka-band. The satellite 106 may use spot beams and frequency and polarization reuse to maximize the total capacity of the system. Signals passing through the satellite 106 in the forward direction, towards the VSATs 104, may be based on the DVB S.2 standard (ETSI EN 302 307) using signal constellations up to and including at least 16-APSK. The signals intended to pass through the satellite 106 in the return direction, toward the hubs, may be based on the IPOS standard (ETSI TS 102 354). Other suitable signal types may also be used in either direction including, for example, higher data rate variations of DVB S.2 and DVB-S2X.

In an example, the IPGW 110 may correspond to the ingress portion of the local network at the gateway 102. Data from outside the gateway 102 may enter the gateway 102 through the IPGW 110. The IPGW 110 may include a spoofer, which may acknowledge transmission control protocol (TCP) traffic sent to the gateway 102. The gateway 102 may be connected to the Internet 108 through the IPGW 110. TCP traffic from the Internet 108 may enter the gateway 102 through the IPGW 110. Remote user devices connected to VSATs 104 in the VSAT population may connect to the Internet 108 through the satellite 106 and the gateway 102.

In an example, the IPGW 110 may be implemented as a separate module or unit outside the gateway 102. In an example, multiple IPGWs 110 may be connected to or included in one gateway 102, thereby, sharing the bandwidth of the RFT 118. At each IPGW 110, real-time (RT) and non-real-time (NRT) traffic flows may be classified into different priorities. These traffic flows may be processed and multiplexed before being forwarded to priority queues at the gateway 102 (or the SGW 114). RT traffic may go directly to the gateway 102 RT priority queue, while NRT traffic flows may be serviced based on the respective priority and volume. The data may be further packed into DVB-S2 code blocks and stored in a code block buffer before transmission.

Data from the Internet 108 intended for a VSAT or a terminal (e.g., 104) in the VSAT population may be in the form of TCP packets, although the data may also be user datagram protocol (UDP) packets or any other suitable IP packets. The packets may enter the gateway 102 at one of the IPGWs 110, where the spoofer may send TCP acknowledgement back to the sender of the TCP packets. The TCP packets may be processed and multiplexed by the gateway 102 along with TCP packets from the other IPGWs 110, where the IPGW 110 may or may not have the same service capabilities and relative priorities. The TCP packets may then be transmitted to the satellite 106 on the forward uplink using the air interface provided by the RFT 118. The satellite 106 may then transmit the TCP packets to the VSAT 104 using the forward downlink. This may be referred to as the outroute. Similarly, TCP packets may enter the ingress at the VSAT 104, be processed by the VSAT 104, and transmitted to the satellite 106 via the VSAT's 104 air interface on the return uplink. The satellite 106 may then send the TCP packets to the gateway 102 using the return downlink. This may be referred to as the inroute.

Proposed architecture of the satellite communication system 100 may allow configurations to add an automatic inroute FAP and throttling scheme into the system. The support for outroute FAP and throttling may be already available in the satellite communication system 100. On the inroute side, existing throttling mechanism may include an externally application programming interface (API)-controlled inroute throttling scheme. The scheme may involve an external trigger (API call) from an external entity to determine the volume of the traffic and accordingly throttle a given terminal if the determined volume exceeds a threshold. However, the scheme may not scale well to desired levels to service a large number of VSATs (e.g., 104) in the VSAT population due to inefficient handling of API calls or external triggers. Therefore, there is a need for an automatic inroute FAP and throttling that is also based on volume usage similar to the outroute FAP without requiring an API call.

In an example, the gateway 102 may implement two approaches. In the first approach or the "Combined Inroute Outroute FAP," the aggregate volume usages may be determined over outroute (downlink) and inroute (uplink) traffic of a terminal and when the preconfigured quota of volume or threshold is exceeded, both outroute and inroute traffic may be throttled simultaneously.

In an example, for the "Combined Inroute Outroute FAP," one set of volume usage quota and limit may be configured in a given service plan to throttle outroute and inroute traffic simultaneously. Both peak time usage limit (Mbytes) and Off-peak usage limit (Mbytes), overall and optionally per Class of Service (CoS) may be configured. In an example, to support only outroute traffic throttling, inroute FAP may be selectively enabled or disabled. Accordingly, when a given service plan may be enabled with inroute FAP, the gateway 102 may perform inroute throttling.

In the second approach or "Independent Inroute FAP," the volume usages may be independently determined for inroute and outroute traffic of a terminal and when two pre-configured and separate quotas or thresholds (e.g., a first threshold and a second threshold) may be respectively exceeded, the outroute and inroute traffic may be throttled individually and not simultaneously. In this case, inroute and outroute traffic may be throttled independent of each other, since the throttling is based on two different quotas or thresholds. This approach may enable an independent throttling of inroute traffic based on the inroute volume threshold.

In an example, the second approach may support a scenario in which the outroute may be throttled because a given user had performed a lot of downloads but had performed fewer uploads till time instant $t_1$. Subsequently, the user may perform more uploads in the uplink direction while being throttled in the downlink direction (because the outroute may carry only acknowledgement messages or ACKs). If the user continues to upload large content, the inroute traffic may be throttled eventually when the configured inroute threshold may be exceeded. Therefore, the second approach may ensure that a user does not get unnecessarily throttled in the inroute direction when the user may not have many activities on the inroute but a huge number of activities on the outroute and vice versa.

In an example, for the "Independent Inroute FAP," a separate volume usage quota and limit may be configured for inroute (than outroute) in a given service plan. Both peak time usage limit (Mbytes) and Off-peak usage limit (Mbytes), overall and optionally per Class of Service (CoS) may be configured.

In an example, a set of configurations may be common to the first and second approaches. For instance, the throttled inroute throughput values (at "peak" and "off-peak" time) may be configured through the service plan in addition to unthrottled throughput values. In an example, the throttled throughput configuration details may depend on the type of Quality of Service (QOS).

For instance, an Adaptive Constant Bit Rate (ACBR) QoS type may be characterized by an optional Peak Information Rate (PIR) or Maximum Information Rate (MIR) throughput, a maximum/overall guaranteed throughput, and a minimum guaranteed throughput subscription. In an example, between minimum and maximum guaranteed, multiple discrete steps may be configured and a real-time bandwidth subscription for Voice over Internet Protocol (VoIP) service may be configured that may be a percentage of the maximum guaranteed throughput subscription. For this QoS type, the throttled peak and off-peak throughputs may be configured against the PIR and maximum/overall guaranteed parts of the subscription. It may be noted by those skilled in the art that the minimum guaranteed part may not be throttled. In an example, it may be recommended to configure the throttled throughput to a value greater than the minimum. If configured in another way, a terminal may receive its minimum throughput which may be more than the configured throttled throughput. Further, when real-time (RT) service is enabled, the configuration may specify a percentage of RT bandwidth with respect to the overall/maximum guaranteed bandwidth (BW) component, which may be allocated as the highest priority for the RT traffic. With the inroute FAP enabled, this percentage may be applied to the throttled overall/maximum guaranteed BW upon a terminal experiencing an inroute FAP to determine the limit of RT BW which may drive the number of VOIP calls that may be generated while the terminal is inroute throttled. In an example, the RT BW may be kept unthrottled always for a terminal experiencing an inroute FAP.

Another example of QoS type may be Committed Information Rate (CIR) QoS type that may be characterized by mandatory PIR or MIR throughput, maximum/overall guaranteed throughput, and minimum guaranteed throughput subscription. In an example, between minimum and maximum guaranteed, there may be no step, and a RT BW subscription for VOIP service may be configured that may be a percentage of the maximum guaranteed throughput subscription. For this QoS type, the throttled peak and off-peak throughputs may be configured against PIR and maximum guaranteed parts of the subscription. It may be noted by those skilled in the art that the minimum guaranteed part may not be throttled. In an example, it may be recommended to configure the throttled throughput to a value greater than the minimum. If configured in another way, a terminal may receive its minimum which may be more than the configured throttled throughput. When the RT service is enabled, the configuration may specify a percentage of RT bandwidth with respect to the maximum guaranteed BW (like in ACBR) which may be allocated as the highest priority for the RT traffic. With the inroute FAP enabled, this percentage may be applied to the throttled overall/maximum guaranteed BW upon a terminal experiencing an inroute FAP to determine the limit of RT BW which may drive the number of VOIP calls that may be generated while the terminal is inroute throttled. In an example, the RT BW may be kept unthrottled always for a terminal experiencing an inroute FAP.

Another example of QoS type may be the Traffic Class Based Best Effort (TCBE) QoS type that may be characterized by one overall maximum throughput or PIR subscription. For this QoS type, the throttled peak and off-peak throughputs may be configured against the overall maximum. When the RT service is enabled, the configuration may specify an absolute throughput value as the limit for on-demand real-time traffic. The peak and off-peak throttled and unthrottled throughputs may be configured for on demand real-time traffic limit as an absolute value. In an example, the RT traffic may be kept unthrottled always.

Referring to FIG. 1, the VSAT 104 may be connected to one or more user devices (phone, laptop, etc.) on a local area network (LAN). The VSAT 104 may communicate with the IPGW 110 and through the IPGW 110, may connect the end user device to a server in an external network. The IGM 112 may reside between the VSAT 104 and the IPGW 110 in the inroute direction. The IGM 112 may be responsible for the dynamic inroute resource allocation to multiple VSATs 104. In an example, the IGM 112 may retrieve user packets from inroute bursts and relay user traffic to the IPGW 110 that may route the user packets to the Internet 108. User packets may be received from the Internet 108 at the IPGW 110, and then the IPGW 110 may propagate these packets through the SGW 114 over the satellite 106 to the VSAT 104.

In an example, an NMS may send the inroute part of the service plan configuration including the peak and off-peak throttled throughputs configuration to the IGM 112. Further, the NMS may send the outroute part of the service plan configuration to the IPGW 110.

In an example, the IPGW 110 may determine the volume usage for both the inroute and outroute traffic of a terminal and determine, based on the preconfigured threshold(s), when a terminal may be throttled. Therefore, the volume usage quota and threshold (e.g., a first threshold and a second threshold) for both the inroute and outroute traffic may be configured on the IPGW 110. Accordingly, the gateway 102 may implement a scheme that may allow for a centralized FAP decision making at the IPGW 110 that may view both the inroute and outroute traffic to support both options of inroute FAP, i.e., the "Combined Inroute Outroute FAP" and the "Independent Inroute FAP," as described earlier. In an example, the IPGW 110 may implement a single stage FAP and a multi-stage FAP as described herein.

In an example, a volume usage policing may be performed in the IPGW 110 even for inroute traffic. For the "Combined Inroute Outroute FAP," the IPGW 110 may determine the aggregate of both the outroute and inroute traffic volume towards the volume quota, whereas for the "Independent inroute FAP," the IPGW 110 may determine the inroute and outroute traffic volume separately. The IPGW 110 may compare the determined inroute and outroute traffic volumes with different preconfigured quotas or thresholds respectively.

In an example, the IPGW 110 may implement inroute throttling for a single-stage FAP and a multi-stage FAP.

Single-Stage Inroute FAP

In the case of single stage inroute FAP, when the volume usage count exceeds the preconfigured quota, throttling may happen on the terminal's inroute traffic. The IPGW 110 may support a plurality of usage buckets when deducting bytes. In an example, both the TCP spoofed and unspoofed inroute and outroute usage may be deducted. In an example, the plurality of usage buckets may include "Anytime usage bucket," "Off-peak usage bucket," and "User's token bucket."

In an example, during peak hours, traffic bytes may be deducted from the overall and per CoS "Anytime usage bucket" only if both are non-empty. If the overall "Anytime usage bucket" is empty, bytes may be deducted from the "user's token bucket." When both the "Anytime usage bucket" and "user's token bucket" are empty, the terminal may be throttled.

In an example, during the off-peak hours, bytes may be deducted from the overall and per CoS off-peak usage buckets if they are not empty. Then, bytes deduction may be performed from the overall and per CoS "Anytime usage buckets" when both are non-empty and the overall or per CoS "off-peak bucket" is empty. Finally, when both off-peak and "anytime usage buckets" are empty, bytes may be deducted from the user token bucket. In an example, when all the buckets are empty, the terminal may be throttled during the off-peak hours.

In an example, when the inroute FAP is enabled, each terminal or VSAT 104 may perform inroute FAP-related operations. For instance, at the time of association with an IPGW (e.g., 110) by a terminal (e.g., 104), a "keep-alive" message may be sent by the IPGW 110 to the terminal 104 containing the information on the terminal's inroute FAP state. In an example, the terminal 104 may know whether it is in an inroute throttled state or not at the startup or after changing its association from a first IPGW to a second IPGW, for instance.

It may be noted by those skilled in the art that when the "Combined Inroute Outroute FAP" option is configured, the throttling of outroute and inroute traffic may occur at the same time as determined by the IPGW 110 based on the determined count of volume usage. Accordingly, both the inroute and outroute traffic bytes may be deducted from a common bytes quota.

On the other hand, when the "Independent Inroute FAP" option is configured, the throttling of inroute traffic may occur independently of the outroute traffic as determined by the IPGW 110 based on an independent inroute byte counting or count of volume usage.

In an example, the IPGW 110 may notify the terminal 104 about the occurrence of inroute FAP and when the terminal is out of FAP. Such a notification may be sent immediately as determined by the IPGW 110. IPGW 110 may also periodically send the inroute FAP state to the terminal 104 via the keep-alive message. In an example, the keep-alive message may be used for other purposes and the inroute FAP state (bits or bytes) may be piggybacked through the keep-alive message. Therefore, a terminal or VSAT 104 may instantaneously know when a transition may have occurred from "throttled" to "unthrottled" inroute or "unthrottled" to "throttled" inroute.

As described earlier, the IGM 112 may be responsible for inroute bandwidth allocation to terminals or VSATs 104 and for processing inroute bursts from the terminals 104. Therefore, the IGM 112 may need to know when a terminal 104 is to be throttled or unthrottled. In an example, the IGM 112 may know the terminal inroute FAP state from the terminal 104 as part of a distributed process where all terminals 104 may convey to the IGM 112 their FAP states after learning the states from the IPGW 110.

In an example, a terminal or a VSAT 104 upon a transition (from "throttle" to "unthrottled" or "unthrottled" to "throttle") while it is active, may send an adaptation message called "Inroute FAP State" indicating the throttled state (throttled or unthrottled) of the terminal 104 to the IGM 112. In an example, the terminal 104 may need to send this new adaptation message in various other states so that the IGM 112 may not get out of sync with respect to the terminal's inroute throttling state at any given instant. Further, the terminal 104 may need to send the "Inroute FAP State" adaptation message when it needs to initialize its context to the IGM 112. In the worst case, it may be possible that there is a time lag (e.g., one exchange of messages) for the correct inroute FAP behaviour to be known by IGM 112.

In an example, when the throttled state is changed while a terminal is inactive, it may send the inroute FAP adaptation message in the first or initial Aloha burst upon becoming active.

In an example, the IGM 112 may keep a track of the inroute FAP state of each terminal or VSAT 104. Further, if the inroute FAP is not enabled on a service plan, the FAP state of a terminal may always be unthrottled. An advantage of the disclosed approach is that the system design is simple and does not require the IGM 112 to save throttled state for every terminal on a network drive and read it from there upon an IGM restart operation or when a terminal moves from one IGM to the other. Each terminal or VSAT 104 may initiate the throttling or get out of the throttling state by always sending the state through an adaptation message to the IGM 112.

In an example, it may be noted by those skilled in the art that an IGM 112 may always receive terminals inroute FAP states after a restart operation or when a terminal moves from one IGM to the other. Thus, the proposed system design ensures that the IGM 112 may never be out of sync with respect to the inroute FAP state of every terminal.

In an example, the IGM 112 may act on the throttled state of terminals. The IGM 112 may know the throughput limit configured in each service plan and when a terminal transitions to its throttled state, the IGM 112 may use the throttled plan to allocate the terminal's bandwidth. Further, overall maximum/PIR, overall/maximum guaranteed, and real-time traffic may be throttled as required for various QoS types described earlier using the configured throttled values. Similarly, when a terminal transitions to its unthrottled state, the IGM 112 may apply the unthrottled plan. It may be noted that the minimum guaranteed part may not be throttled. In an example, the IGM 112 may use the throttled real-time throughput to determine whether to allow a real-time VOIP call or not or how many calls may be allowed when a terminal is in a throttled state. Further, as described earlier, throttling may happen differently at peak and off-peak times. In an example, the RT subscription may not be throttled.

In an example, the disclosed approach may have an in-built data loss error handling for the adaptation message.

For instance, if a burst containing the inroute FAP adaptation message gets lost, the adaptation message may be retransmitted. Further, until the IGM 112 receives the new state from the terminal, the previous state may be assumed for the traffic flows.

Multi-Stage Inroute FAP

Multi-stage FAP may be supported for inroute traffic with up to five stages using the volume-based quota in accordance with an example. The throttled speed for each stage may be specified or configured as the percentage of the nominal un-throttled throughput/speed. For each stage, a percentage of the volume usage quota may also be specified where 100% corresponds to the final stage. In an example, the nominal un-throttled speed may depend on a specific QoS type, which may be only maximum non-guaranteed or peak, or a set of speeds (e.g., maximum guaranteed, maximum non-guaranteed). It may be noted that the minimum guaranteed part may never be throttled. In an example, the counting of volume usage may be performed either by aggregating the volume of downlink (or forward direction) and uplink (or return direction) traffic or independently on inroute traffic of a terminal or site based on the options configured.

In an example, the outroute and inroute multi-stage FAPs may go hand in hand when the "Combined Inroute Outroute FAP" option may be configured. The outroute and inroute multi-stage FAPs may be enforced independently when the "Independent Inroute FAP" option may be configured. In an example, the service plan may include a multi-stage FAP plan where the percentages at different stages may be specified.

In an example, the FAP state information adaptation message sent from a terminal 104 to the IGM 112 may always contain the terminal's inroute FAP stage (1 . . . 5, or 0 if no multi-stage FAP or the condition of any stage is triggered yet) in addition to the throttled or unthrottled FAP state. The stage information of the multi-stage FAP may exist in the IPGW's 110 keep-alive message that may be sent to the terminals 104. It may be noted by those skilled in the art that the IPGW 110 may be responsible for determining the stage which is conveyed to a given terminal. Subsequently, the terminal 104 may convey the determined/conveyed stage to the IGM 112.

For example, one may configure three stages of FAP such that when 50% of the volume quota is reached, configuration 1 may be applied, once the quota reaches 70%, a separate configuration 2 may be applied, and finally when 100% of the quota is exhausted, configuration 3 may be applied. In an example, the configurations 1, 2, and 3 may correspond to percentages of un-throttled throughput of a site separately for downlink and uplink (e.g., configuration 1: 40% for forward/downlink and 35% for return/uplink, configuration 2: 30% for forward/downlink and 26% for return/uplink, and configuration 3: 15% for forward/downlink and 10% for return/uplink).

The following table captures the above example. The maximum % of volume usage that may be specified is 100% (may be configured as stage 4).

| Stage | % Of Volume Usage Used Quota | % Of Peak Unthrottled Downlink Throughput | % Of Peak Unthrottled Uplink Throughput |
|---|---|---|---|
| Stage 1 | 50% | 40% | 35% |
| Stage 2 | 70% | 30% | 26% |
| Stage 3 | 100% | 15% | 10% |

It may be noted by those skilled in the art that the multistage FAP, as described above, may not be applicable during the off-peak period. During the off-peak period, the single-stage FAP may be in effect. It may be noted by those skilled in the art that the NMS may provide all the configurations required for implementing the multi-stage FAP plan.

Weekend Vs Weekdays Off-Peak Time

In an example, each of the 24 hours of a day may be divided into peak and off-peak zones. Through the service plan, the unthrottled and throttled throughput for the peak time and the same for the off-peak time may be configured separately by the NMS. From the service plan configuration interface at the NMS (not shown), the off-peak zone's start time, and the duration of off-peak time may be defined.

In another example, the disclosed system may support a "day of the week" basis definition of off-peak and peak usage times. Accordingly, the configuration may be divided into two categories—i) weekdays peak and off-peak and ii) weekends (Saturday and Sunday) peak and off-peak.

The configuration may specify differently the off-peak zone for Weekdays and Weekends by assigning one value for Monday to Friday and another value for Saturday and Sunday. An example representation may be:

51:CC1DD1CC2DD2, where 51 may represent a service plan index specification of the off-peak time;

CC1: [00-23] Off-peak start time for Monday to Friday;

DD1: [00-24] Off-peak duration for Monday to Friday;

CC2: [00-23] Off-peak start time for Monday to Friday; and

DD2: [00-24] Off-peak duration for Saturday and Sunday.

In an example, the off-peak time may be defined with weekly scheduling, for example, Monday to Friday 10 PM to 5 AM, Saturday 10 PM to 12 PM, and Sunday 10 PM to 12 PM. Then, the SPI 51 may be represented as: 51:22072202

Similar to outroute, the peak and off-peak time-based throttling including the weekday vs weekend based different off-peak times may be applied on inroute. The IGM 112 may not determine the peak and off-peak zones by itself including a different timing for the weekday or the weekend since IGM 112 may not receive the configuration. The keep-alive message from the IPGW 110 received at the terminal may indicate the current appropriate zone to the terminal. It may be the responsibility of the IPGW 110 to evaluate each terminal's peak and off-peak state. As described earlier, the IPGW 110 may receive the configuration (part of the service plan) of peak and off-peak time definitions from the NMS. A mechanism may be present via which an IGM 112 may know the current peak and off-peak state of a terminal 104.

Fraud Protection

As described earlier, a terminal (e.g., 104) may provide its inroute throttle state (or FAP state) along with the FAP stage (if multi-stage FAP is enabled) to the IGM 112 through the "FAP state info" adaptation message. To prevent a possible hacking of this information and the hacker getting unthrottled service when the site is supposed to get a throttled service, the disclosed system may protect the information from an integrity viewpoint. Such adaptation info or message may also be encrypted to prevent eavesdropping.

In an example, the integrity may be achieved by signing the throttle state and FAP stage information so that the intended recipient (in this case IGM 112) may be confident that the adaptation message may not have been changed illicitly or compromised for integrity.

One of the example approaches may be a Hash-Based Message or Information Authentication Code (HMAC) scheme that may be used to create the inroute throttle state and stage signature metadata. In an example, HMAC scheme may implement a specific construction for calculating a message authentication code (MAC) involving a cryptographic hash function in combination with a secret key.

In an example, the service signature may be performed/generated by the NMS and the IPGW 110, wherein the service signature may be a hash of the Service Parameter Information (SPI), the terminal's service state, the terminal's device ID, and the service plan string. The IPGW 110 may be configured with the master cryptographic key which may also be used by the NMS. This key may be sent to the IGM 112 by the NMS. In an example, the length of the service signature may be 256 bits or 32 bytes.

In an example, a master key may be used for the purpose of generation of the inroute FAP state/stage signature. The signature creation may take place dynamically each time a terminal's inroute FAP state and/or state changes or the terminal associates with an IPGW 110. The IPGW 110 may calculate a signature by using the configured key and the following parameters for the hash evaluation:

Terminal's inroute FAP state—0: unthrottled; 1: throttled
Terminal's multi-stage FAP current stage—0 or 1-5
Terminal's Service Association Indicator (SAI)
Terminal's Service Plan string In an example, the length of the inroute FAP state/stage signature may be 32 bytes. However, for bandwidth resource efficiency, the first 8 bytes of the signature may be used in the disclosed system across all components, which may be configurable within the range of 8 to 32 in one-byte step. The IPGW 110 may always send the inroute FAP signature via the keep-alive message to the terminal 104 when the terminal 104 is enabled for the inroute FAP. Subsequently, the terminal 104 may send this signature via the FAP state info adaptation message to the IGM 112 if it receives the signature key from the IPGW 110. The IGM 112 may use the configured key to compute a signature from the inroute FAP state/stage information, terminal SAI, and terminal service plan string. The IGM 112 may determine the throttled state and stage from the adaptation info, and the terminal's SAI and service plan string through the context initialization process. The IGM 112 may then compare its calculated signature with the signature supplied by the terminal. If the two signatures do not match, the terminal's service may be rejected. The rejection may be propagated to the terminal 104 by the IPGW 110.

Policing Interval

In an example, for both "Combined Inroute Outroute FAP" and "Independent Inroute FAP" approaches, multiple policing interval selections may be supported. For example, policing intervals may be hourly, daily, weekly, and monthly. Such policing interval options may be configured via the service plan configuration interface and sent to the IPGW 110, which may perform the volume usage policing for the terminals.

Multiple Time Zone

In an example, multiple time zone support may be provided. For instance, the IGM 112 may support multiple time zones, and the throttled throughput determination may consider the terminal's time zone in order to apply peak and off-peak hours which the IGM 112 receives from the terminal 104.

Class of Service (CoS) Bypass

In an example, the system may support a CoS bypass feature for the inroute FAP. The CoS bypass feature may be supported in two ways. The first way may consider whether bytes on a CoS are counted or not towards the volume usage. The bytes may not be counted when a CoS is configured as a bypass. In an example, a CoS may be configured as a bypass by specifying "0" (zero) in any-time usage limit and off-peak usage limit. The same CoS(es) or different CoS(es) may be configured for inroute and outroute bypass. The second way may consider whether the system throttles the CoS or not when a terminal is in overall FAP.

Movement of Terminals Between Gateways

There may be a scenario in which a terminal may move between IPGWs, between IGMs, and between physical gateways for various reasons. In an example, the IPGW 110 may store the FAP info of each terminal into a local Network Attached Storage (NAS) drive. When a terminal may move to or associate with a different/new IPGW within the same gateway, the new IPGW may read the terminal's FAP info from the local NAS, so it may know whether the associating terminal is inroute throttled or not.

If a terminal may move to a different IGM 112, it may always send the FAP state info adaptation message in the first burst and from it, the new IGM may know the terminal's inroute FAP state.

In another example, a terminal may move to a different physical gateway. If the system is distributed, then the terminal may include its FAP info in the association message to the IPGW 110. Upon association with the IPGW 110 in the new physical gateway, the IPGW 110 may convey the terminal's inroute throttled state and stage to the terminal via the keep-alive message, as described earlier. The terminal may convey the state to the new IGM. If in case the inroute FAP info is not known to the terminal, the terminal may need to wait until the IPGW association is complete before it may inform the state to the IGM. Until then, the IGM may not throttle a terminal and the existing FAP may continue. In an example, the system may implement a rule that the IGM may not inroute throttle a terminal when the IGM may not know about the terminal's inroute FAP status.

In a centralized system, in most cases, the serving IPGW may not change when a terminal moves to a different physical gateway. However, the serving IGM may change. Therefore, the terminal may always send the FAP state info adaptation message in the first burst and via which it may convey the inroute FAP state to the IGM. [The previous paragraph mentions the scenario of a distributed system. Please confirm if this is fine].

In an example, several volume usages based FAP related features may be supported by the disclosed system. Such features may include pre-paid time or megabyte-based token subscription, direct token addition to the volume usage bucket, token expiry at anniversary vs never expires, and overage billing in the context of inroute FAP. In an example, FAP early warning feature may be supported.

Figure 2A:
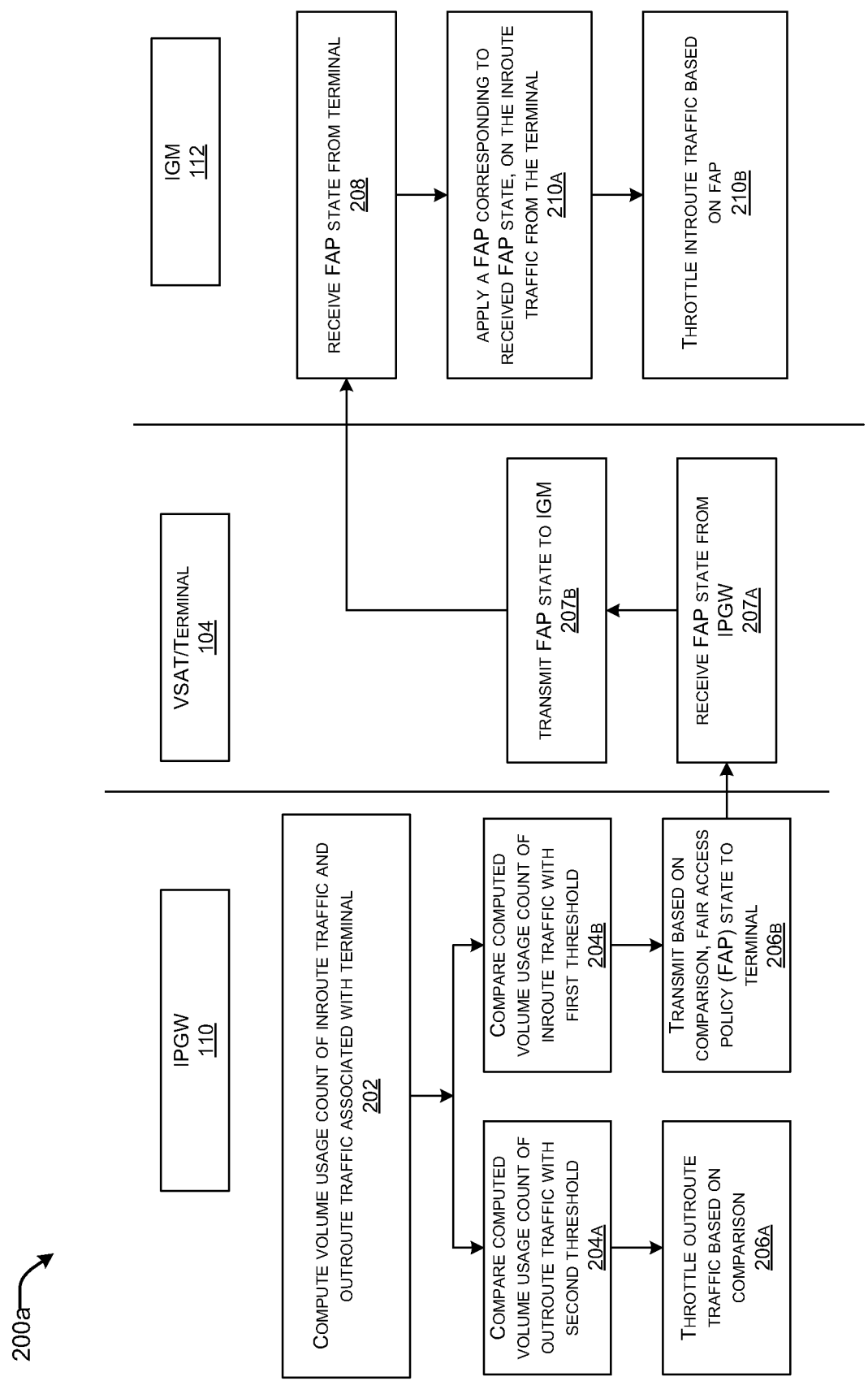
FIG. 2A illustrates a method for inroute throttling in a satellite network using an "Independent Inroute FAP".

FIG. 2A illustrates a method 200a for inroute throttling in a satellite network using an "Independent Inroute FAP". As shown in FIG. 2, the method 200a may include the step 202 of computing, by an IPGW 110, a volume usage count of inroute traffic and outroute traffic associated with a terminal 104. The method 200a may further include the step 204a of comparing, by the IPGW 110, the computed volume usage count of the outroute traffic with a second threshold. The method 200a may further include the step 204b of comparing, by the IPGW 110, the computed volume usage count of the inroute traffic with a first threshold. The method 200a may further include, at step 206a, throttling, by the IPGW 110, based on the comparison at step 204a, outroute traffic towards the terminal 104. The method 200a may further include, at step 206b, transmitting, by the IPGW 110, based on the comparison at steps 204b, a FAP state to the terminal 104. In an example, the FAP state may correspond to one of a throttled and an unthrottled and in case of "Independent Inroute FAP," the FAP state may be determined independently for the inroute channel based on the preconfigured first threshold.

In an example, the method 200a may further include, at step 207a, receiving, by the terminal (or VSAT 104) from the IPGW 110, the FAP state as determined and transmitted by the IPGW 110. In an example, the IPGW 110 may transmit the FAP state as part of the keep-alive message. In an example, the IPGW 110 may periodically determine and transmit the FAP state to the terminal 104. In an example, such periodicity may be configured as part of service plan configuration. The method 200a may further include, at step 207b, transmitting the FAP state, by the terminal 104 to the IGM 112. In an example, the terminal 104 may transmit the adaptation message in the event of a transition of the FAP state from one to the other (from "throttle" to unthrottled" and vice versa). In the event of the terminal 104 moving between IPGWs and/or IGMs, the terminal 104 may first associate with a new IPGW, receive the FAP state (persistent state that was last applicable and was stored in NAS by the IPGWs), and transmit the FAP state so received to the IGM (new or existing).

The method 200a may further include, at step 208, receiving, by the IGM 112, from the terminal 104, the FAP state. The method 200a may further include, at step 210a, applying, by the IGM 112, a FAP corresponding to the received FAP state, on the inroute traffic from the terminal 104. The method 200a may further include, at step 210b, throttling, by the IGM 112, inroute traffic from the terminal 104 based on applied FAP. It may be noted that the steps 204b, 210a, and 210b may be executed independent of the steps 204a and 206a.

Figure 2B:
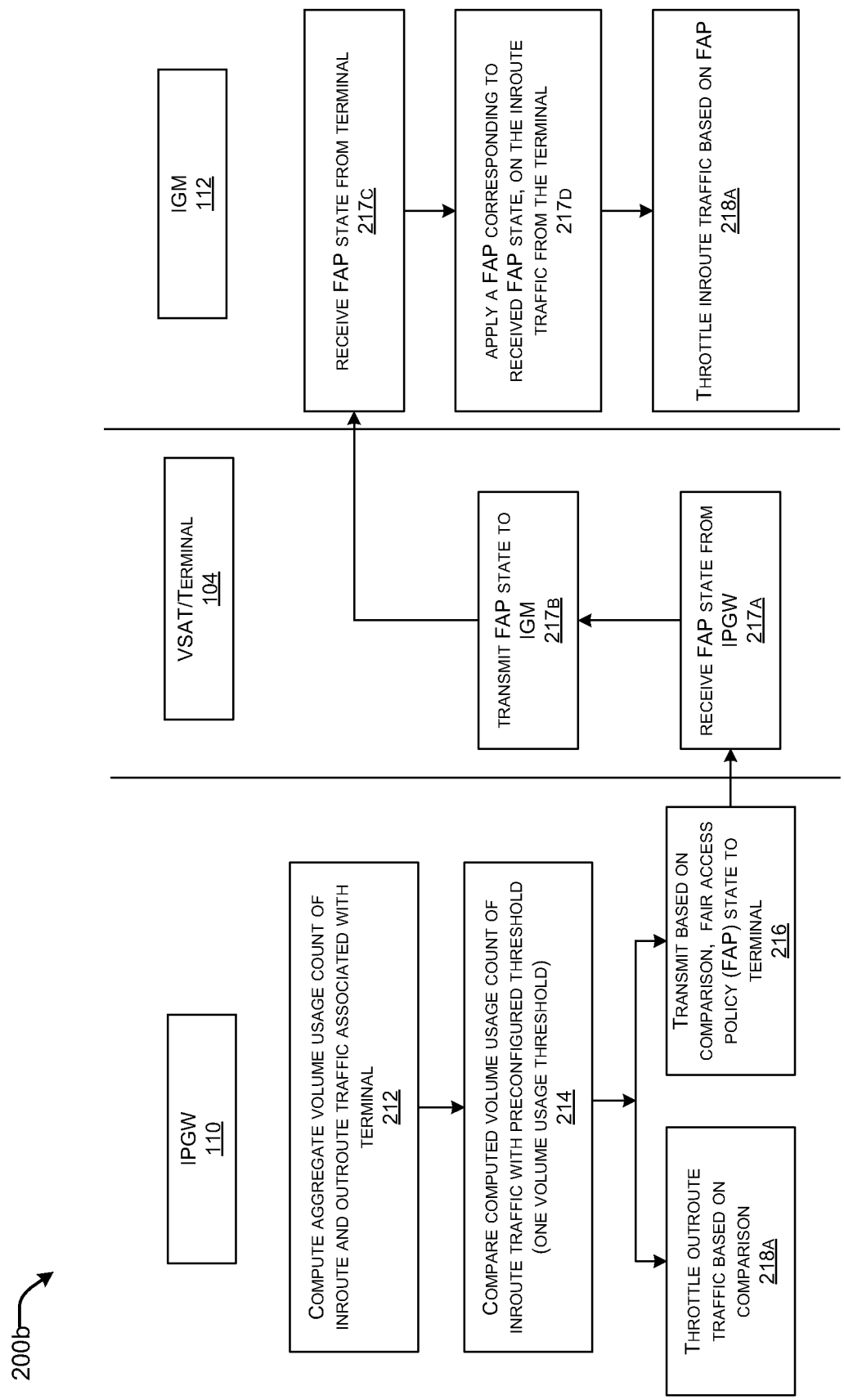
FIG. 2B illustrates a method for inroute throttling in a satellite network using a "Combined Inroute Outroute FAP".

FIG. 2B illustrates a method 200b for inroute throttling in a satellite network using a "Combined Inroute Outroute FAP". As shown in FIG. 2b, the method 200b may include the step 212 of computing, by an IPGW 110, an "aggregate" volume usage count of inroute traffic and outroute traffic associated with a terminal 104. The method 200b may further include the step 214 of comparing, by the IPGW 110, the computed aggregate volume usage count of the inroute and outroute traffic with a preconfigured threshold (i.e., one volume usage threshold). The method 200 may further include, at step 206a, throttling, by the IPGW 110, based on the comparison at step 214, outroute traffic towards the terminal 104. The method 200b may further include, at step 216, transmitting, by the IPGW 110, based on the comparison at step 214, a FAP state to the terminal 104. The method 200b may further include, at step 217a, receiving, by the terminal (or VSAT 104) from the IPGW 110, the FAP state as determined and transmitted by the IPGW 110. The method 200b may further include, at step 217b, transmitting the FAP state, by the terminal 104 to the IGM 112. The method 200b may further include, at step 217c, receiving, by the IGM 112, from the terminal 104, the FAP state. The method 200b may further include, at step 217d, applying, by the IGM 112, a FAP corresponding to the received FAP state, on the inroute traffic from the terminal 104. The method 200b may further include, at step 218b, throttling, by the IGM 112, inroute traffic from the terminal 104 based on applied FAP. It may be noted that step 218a and 218b may be executed simultaneously and both the inroute and outroute traffic may be throttled based on the comparison of aggregate volume usage count and a single predefined threshold.

Figure 2C:
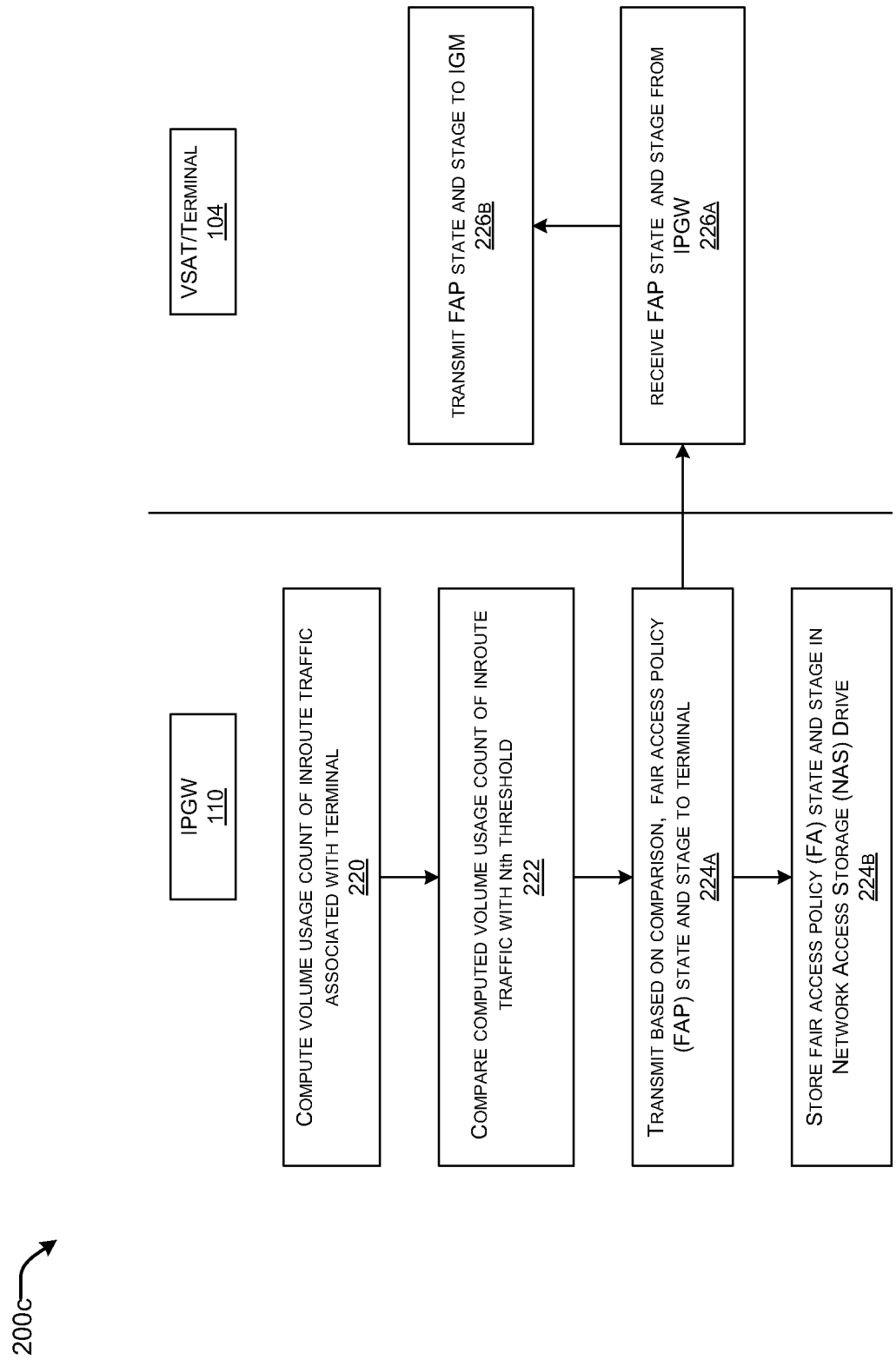
FIG. 2C illustrates a method for inroute throttling in case of a multi-stage FAP implemented by the IPGW.

In an example, the FAP state and the FAP stage (e.g., in case of multi-stage FAP) may be transmitted by the IPGW 110, as part of a periodic keep-alive message, to the terminal 104. FIG. 2C illustrates a method 200c for inroute throttling in case of a multi-stage FAP implemented by the IPGW. As shown in FIG. 2C, the method 200c may include the step 220 of computing, by an IPGW 110, a volume usage count of inroute traffic associated with a terminal 104. The method 200c may further include, at step 222, comparing, by the IPGW 110, the computed volume usage count of the inroute traffic with Nth threshold (out of multiple thresholds as defined in multi-stage FAP). The method 200c may further include, at step 224a, transmitting, by the IPGW 110, a FAP state and FAP stage (e.g., $1^{st}$ stage, or $2^{nd}$ stage or Nth stage) to the terminal 104 based on the comparison at step 222. The method 200c may further include, at step 224b, storing, by the IPGW 110, the FAP state and FAP stage in a network access drive (NAS). The method 200c may further include, at step 226a, receiving, by the terminal (or VSAT 104) from the IPGW 110, the FAP state and FAP stage transmitted by the IPGW 110. The method 200c may further include, at step 226b, transmitting the FAP state and FAP stage, by the terminal 104 to the IGM 112.

In an example, the method 200a, 200b, and 200c may further include the step of receiving, by the IPGW 110, a set of configurations for throttled inroute throughput values at peak and off-peak time and unthrottled throughput values. In an example, the throttled inroute throughput values may be based on a type of QoS associated with the terminal 104. In an example, the method 200a, 200b, and 200c may further include the step of receiving, by the IPGW 110, an outroute part of service plan configuration from NMS.

Figure 2D:
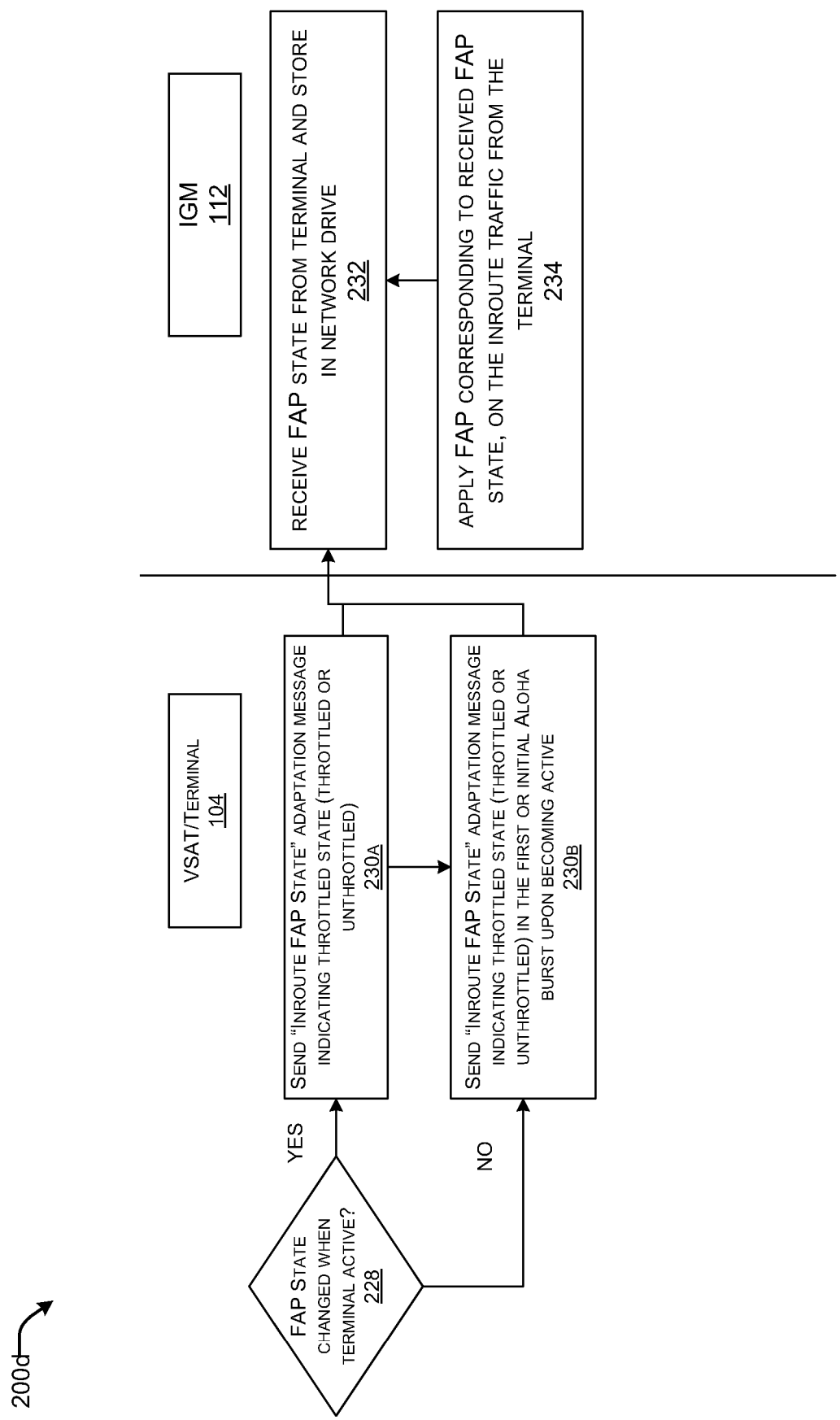
FIG. 2D illustrates an example communication method $200d$ between the terminal and the IGM for inroute throttling.

FIG. 2D illustrates an example communication method 200d between the terminal and the IGM for inroute throttling. In an example, the method 200d may include, at step 228, determining by the terminal 104, whether an FAP state associated with the terminal 104 changed when the terminal was active. In case of a positive determination at step 228, the method 200d may include, at step 230a, sending "Inroute FAP State" adaption message indicating a throttling state (throttled or unthrottled). If the terminal was active when the FAP state changed, then the method 200d may include, at step 230b, sending "Inroute FAP State" adaption message indicating a throttling state (throttled or unthrottled) in the first initial Aloha burst upon becoming active. The method 200d may further include, at step 232, receiving, by the IGM 112, the FAP state (as part of the adaptation message) from the terminal and storing the FAP state a network drive associated with the IGM 112. In an example, the adaption message may be sent by the terminal 104 responsive to a transition of the FAP state between the throttled and the unthrottled states. The method 200d may further include the step of determining, by the IGM 112, a new FAP to be applied on the inroute traffic based on the last received adaptation message. In an example, the method 200d may include, at step 234, applying the FAP based on a corresponding service plan configuration or the received FAP state. In an example, the service plan configuration may include peak time usage limit and off-peak usage limit, overall limit, and per CoS limit. The service plan configuration may be received by the IGM 112 from the NMS and may include peak throughput configuration and off-peak throttled throughput configuration.

Although not shown, the NMS may be a part of the satellite communication system 100 shown in FIG. 1, in an example. The NMS may be responsible for providing all the configuration information, threshold values, maximum and minimum values, service plan descriptions, subscription data, exceptions for FAP rules, configuration of additional features (policing intervals, peak/off-peak times, early warning thresholds, multi-stage/single-stage FAP configurations, bandwidth allocation rules) to the IPGW 110 and/or the IGM 112. In an example, the NMS may provide a service plan configuration interface that may enable an admin user or service provider to manually configure or modify the service plan definitions.

The disclosed system may implement an automated inroute throttling in a satellite network. In an example, once the IPGW 110 and the IGM 112 may receive the service plan definitions, parameters, configurations, and other metadata as required, the method described herein may be automated and may be performed in an autonomous manner. Such automated inroute throttling may implement Artificial Intelligence algorithms/models to perform predictive analysis to pre-empt any loss of service or failure in future. For instance, the peak and off-peak times as defined by service plan configuration may in practice differ from the actual peak and off-peak times. Such deviations from the norm or expected/configured values may be recorded, observed, and reported to the NMS by the IPGW 110 and/or the IGM 112.

In an example, a manual intervention, if required, may be implemented to override the decision making ability/logic of the IPGW 110 and the execution ability/logic of the IGM 112.

It may be appreciated that, in certain aspects, a single component may be replaced by multiple components, and multiple components may be replaced by a single component, to provide an element or structure or to perform a given function or a set of functions. Except where such substitution may not be operative to practice certain examples of the present systems and methods, such substitution may be considered within the scope of the ongoing description. For instance, although FIGS. 1 and 2 show the IPGW 110 and the IGM 112 as separate modules/components in the gateway 102, it may be appreciated that the IPGW 110 may be implemented as a separate module/component and may not be a part of the gateway 102. In another example, the IPGW 110 and the IGM 112 may be integrated and implemented as a single module or component without departing from the scope and functionality of the individual module/component.

Figure 3:
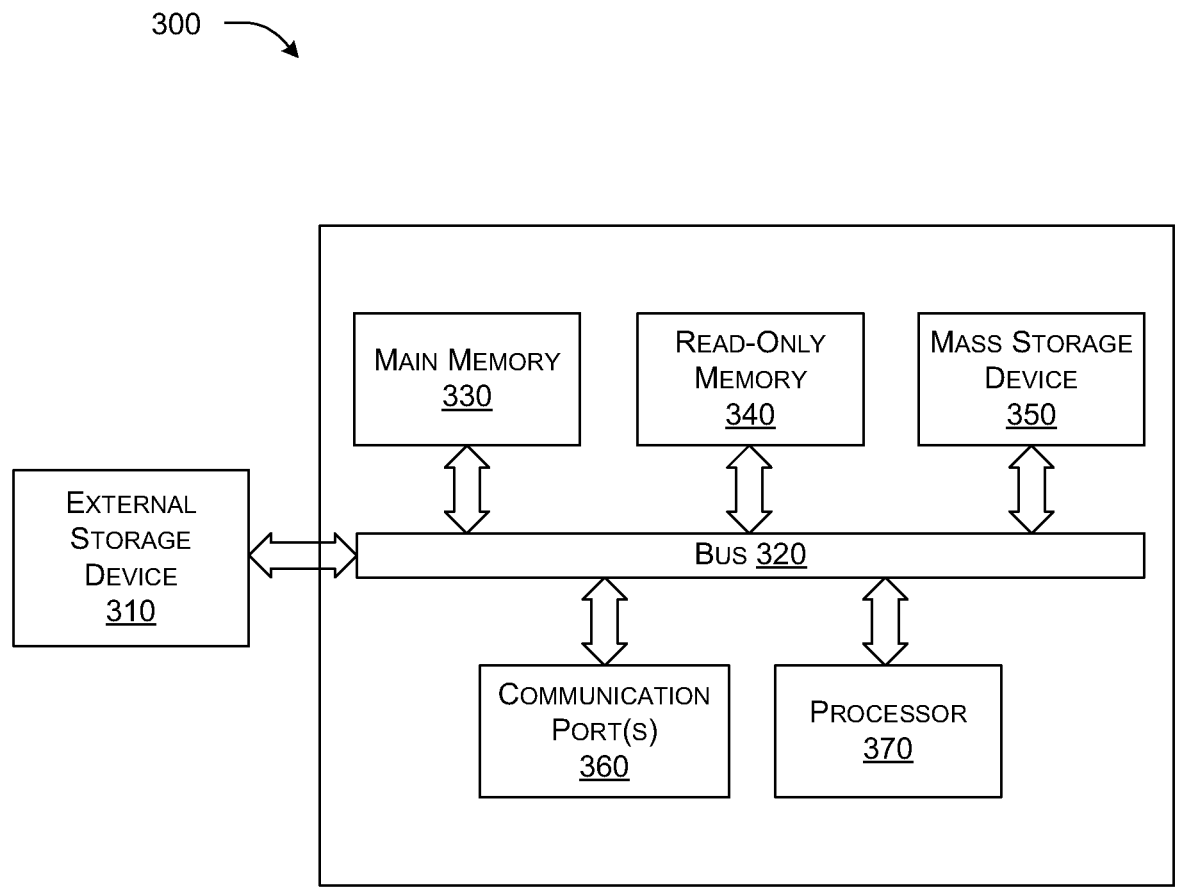
FIG. 3 illustrates a computer system in which or with which example of the present disclosure may be implemented.

FIG. 3 illustrates a computer system 300 in which or with which examples of the present systems may be implemented. In particular, the disclosed system, such as, gateway 102, IPGW 110, IGM 112, and SGW 114 may be implemented as the computer system 300.

Referring to FIG. 3, the computer system 300 may include an external storage device 310, a bus 320, a main memory 330, a read-only memory 340, a mass storage device 350, communication port(s) 360, and a processor 370. A person skilled in the art will appreciate that the computer system 300 may include more than one processor and communication ports. The communication port(s) 360 may be any of an RS-232 port for use with a modem-based dialup connection, a 10/100 Ethernet port, a Gigabit or 10 Gigabit port using copper or fibre, a serial port, a parallel port, or other existing or future ports. The communication port(s) 360 may be chosen depending on a network, such a Local Area Network (LAN), Wide Area Network (WAN), or any network to which the computer system 300 connects. The main memory 330 may be random access memory (RAM), or any other dynamic storage device commonly known in the art. The read-only memory 340 may be any static storage device(s) including, but not limited to, a Programmable Read Only Memory (PROM) chips for storing static information e.g., start-up or basic input/output system (BIOS) instructions for the processor 370. The mass storage device 350 may be any current or future mass storage solution, which may be used to store information and/or instructions. The bus 320 communicatively couples the processor 370 with the other memory, storage, and communication blocks. The bus 320 can be, e.g., a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 370 to the computer system 300. Optionally, operator and administrative interfaces, e.g., a display, keyboard, and a cursor control device, may also be coupled to the bus 320 to support direct operator interaction with the computer system 300. Other operator and administrative interfaces may be provided through network connections connected through the communication port(s) 360. In no way should the aforementioned exemplary computer system limit the scope of the present disclosure.

In some examples, the method or methods described above may be executed or carried out by the computing system 300 including a tangible computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system, comprising:
an Internet Protocol Gateway (IPGW) comprising a first processor and a first memory coupled to the first processor, wherein the first memory comprises processor-executable instructions, which on execution by the first processor, cause the IPGW to:
compute a volume usage count of inroute traffic associated with a terminal;
compare the computed volume usage count of the inroute traffic with a first threshold; and
transmit, based on the comparison, a fair access policy (FAP) state to the terminal, wherein the FAP state corresponds to one of a throttled and an unthrottled state; and
an Inroute Group Manager (IGM) comprising a second processor and a second memory coupled to the second processor, wherein the second memory comprises processor-executable instructions, which on execution by the second processor, cause the IGM to:
receive, from the terminal, the FAP state;
apply a FAP, on the inroute traffic from the terminal, corresponding to the received FAP state; and
assign bandwidth to the terminal based at least on one or more parameters upon applying the FAP on the inroute traffic from the terminal, wherein the one or more parameters comprise the computed volume usage count of the inroute traffic from the terminal, a request for bandwidth received from the terminal, a service plan applicable to the terminal, a policing interval, peak or off-peak time configurations, and a plurality of levels of subscriptions.

2. The system of claim 1, wherein the first memory comprises processor-executable instructions, which on execution by the first processor, cause the IPGW to:
compute a volume usage count of outroute traffic associated with the terminal; and
compare the computed volume usage count of the outroute traffic with a second threshold.

3. The system of claim 2, wherein the FAP state is determined based on:
the comparison of the computed volume usage count of the inroute traffic with the first threshold; and
the comparison of the computed volume usage count of the outroute traffic with the second threshold.

4. The system of claim 1, wherein the FAP state is transmitted as part of a periodic keep-alive message to the terminal.

5. The system of claim 1, wherein the first memory comprises processor-executable instructions, which on execution by the first processor, cause the IGM to:
receive an inroute part of service plan configuration from a network management system (NMS), wherein the service plan configuration comprises peak and off-peak throttled throughput configurations.

6. The system of claim 5, wherein the service plan configuration comprises at least one of peak time usage limit and off-peak usage limit, overall limit, and per Class of Service (CoS) limit.

7. The system of claim 1, wherein the second memory comprises processor-executable instructions, which on execution by the second processor, cause the IGM to:
receive an adaptation message from the terminal responsive to a transition of the FAP state between the throttled and the unthrottled states; and
determine a new FAP to be applied on the inroute traffic based on the adaptation message.

8. The system of claim 1, wherein the FAP is applied based on a corresponding service plan configuration.

9. The system of claim 1, wherein the first memory comprises processor-executable instructions, which on execution by the first processor, cause the IPGW to:
receive a set of configurations for throttled inroute throughput values at peak and off-peak time and unthrottled throughput values, wherein the throttled inroute throughput values are based on a type of Quality of Service (QOS) associated with the terminal.

10. A method, comprising:
computing, by an Internet Protocol Gateway (IPGW), a volume usage count of inroute traffic associated with a terminal;
comparing, by the IPGW, the computed volume usage count of the inroute traffic with a first threshold;
transmitting, by the IPGW, based on the comparison, a fair access policy (FAP) state to the terminal, wherein the FAP state corresponds to one of a throttled and an unthrottled;
receiving, by an Inroute Group Manager (IGM), from the terminal, the FAP state;
applying, by the IGM, a FAP corresponding to the received FAP state, on the inroute traffic from the terminal; and
assigning, by the IGM, bandwidth to the terminal based at least on one or more parameters upon applying the FAP on the inroute traffic from the terminal, wherein the one or more parameters comprise the computed volume usage count of the inroute traffic from the terminal, a request for bandwidth received from the terminal, a service plan applicable to the terminal, a policing interval, peak or off-peak time configurations, and a plurality of levels of subscriptions.

11. The method of claim 10, further comprising:
computing, by the IPGW, a volume usage count of outroute traffic associated with the terminal; and
comparing, by the IPGW, the computed volume usage count of the outroute traffic with a second threshold.

12. The method of claim 11, further comprising determining FAP state based on:
the comparison of the computed volume usage count of the inroute traffic with the first threshold; and
the comparison of the computed volume usage count of the outroute traffic with the second threshold.

13. The method of claim 10, wherein the FAP state is transmitted as part of a periodic keep-alive message to the terminal.

14. The method of claim 10, further comprising:
receiving, by the IGM, an inroute part of service plan configuration from a network management system (NMS), wherein the service plan configuration comprises peak throughput configuration and off-peak throttled throughput configuration.

15. The method of claim 14, wherein the service plan configuration comprises peak time usage limit and off-peak usage limit, overall limit, and per Class of Service (CoS) limit.

16. The method of claim 10, further comprising:
receiving, by the IGM, an adaptation message from the terminal responsive to a transition of the FAP state between the throttled and the unthrottled states; and
determining, by the IGM, a new FAP to be applied on the inroute traffic based on the adaptation message.

17. The method of claim 10, wherein the FAP is applied based on a corresponding service plan configuration.

18. The method of claim 10, further comprising:
receiving, by the IPGW, a set of configurations for throttled inroute throughput values at peak and off-peak time and unthrottled throughput values, wherein the throttled inroute throughput values are based on a type of Quality of Service (QOS) associated with the terminal.

19. A non-transitory computer readable medium comprising processor-executable instructions that when executed cause the processor to:
compute, at an Internet Protocol Gateway (IPGW), a volume usage count of inroute traffic associated with a terminal;
compare, at the IPGW, the computed volume usage count of the inroute traffic with a first threshold;
transmit, by the IPGW, based on the comparison, a fair access policy (FAP) state to the terminal, wherein the FAP state corresponds to one of a throttled and an unthrottled;
receive, at an Inroute Group Manager (IGM), from the terminal, the FAP state;
apply, by the IGM, a FAP corresponding to the received FAP state, on the inroute traffic from the terminal; and
assign, by the IGM, bandwidth to the terminal based at least on one or more parameters upon applying the FAP on the inroute traffic from the terminal, wherein the one or more parameters comprise the computed volume usage count of the inroute traffic from the terminal, a request for bandwidth received from the terminal, a service plan applicable to the terminal, a policing interval, peak or off-peak time configurations, and a plurality of levels of subscriptions.

* * * * *